Jan. 7, 1930.  E. CURTIS ET AL  1,742,950

STRAINER

Filed Dec. 21, 1925  2 Sheets-Sheet 1

Inventors
Emmett Curtis
Ernest A. Mummé
By Alex. Lagaard
Attorney

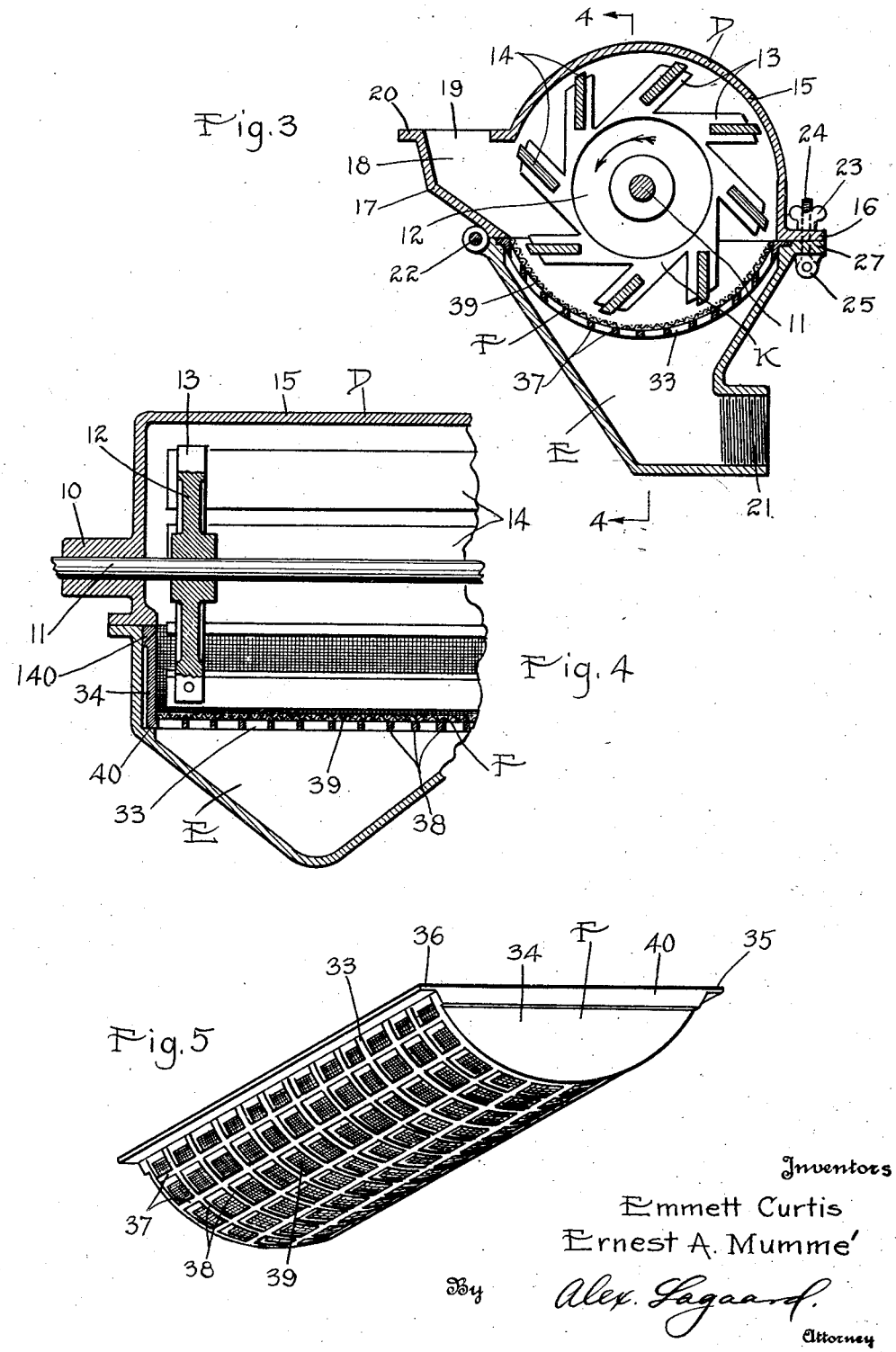

Patented Jan. 7, 1930

1,742,950

UNITED STATES PATENT OFFICE

EMMETT CURTIS AND ERNEST A. MUMMÉ, OF MINNEAPOLIS, MINNESOTA

STRAINER

Application filed December 21, 1925. Serial No. 76,717.

Our invention relates to strainers and has for its object to provide a machine adapted to rapidly and effectively strain liquids and separate foreign matter therefrom.

The particular object of the invention resides in providing a casing, having a shaft, carrying an agitating member together with a hinged closure therefor in which may be removably positioned a screen or perforated sieve.

Another object of the invention resides in arranging said closure on the lower portion of the machine so that the same can be readily dropped and the foreign matter easily removed therefrom.

A still further object resides in arranging the screen in arcuate formation positioned about the periphery of the agitating member.

Another object of the invention resides in providing the agitating member with incline blades operating in close proximity to the arcuate screen so as to cause the liquid to be forced through the screen as the device operates.

Other objects of the invention reside in the detailed construction of the same as disclosed in the following specification and drawings.

In the drawings illustrating our invention in one form:

Fig. 3 is a sectional view taken on line 3—3 of Fig. 2 and drawn to an enlarged scale.

Fig. 4 is a fragmentary sectional view taken on line 4—4 of Fig. 3.

Fig. 5 is a view of the screen of the invention drawn in oblique.

In the straining of various liquids, where an exceptionally fine mesh screen is employed in order to separate from the liquid fine particles of foreign matter, it is highly desirable to have a device in which the separation is accelerated as compared with the usual method where the separation occurs by gravity. In addition it is highly desirable to maintain the screen surface more or less free from the residue so that the same is at all times available for the permutation of the liquid. Our invention accomplishes these desirable results in a simple and effective manner as will become apparent from the following description thereof.

Figure 1:
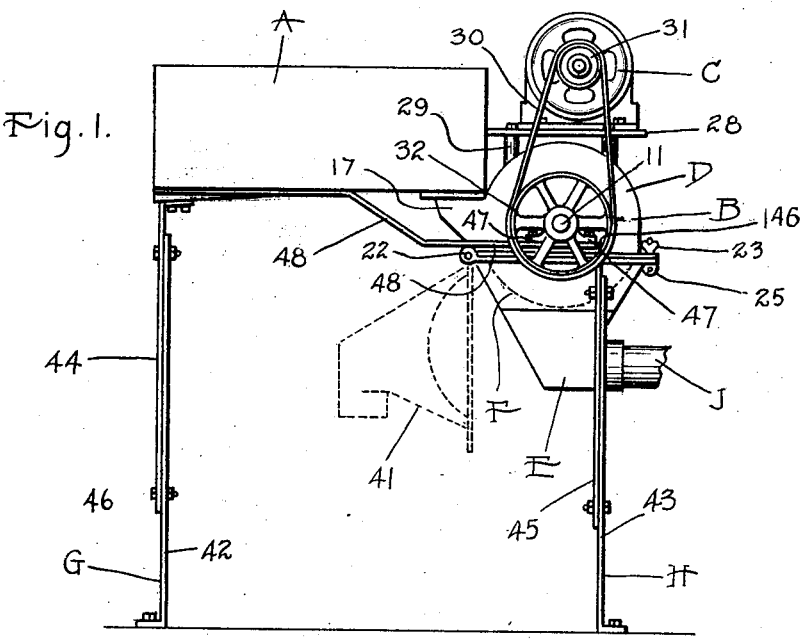
Fig. 1 is a side elevational view of our invention.
Figure 2:
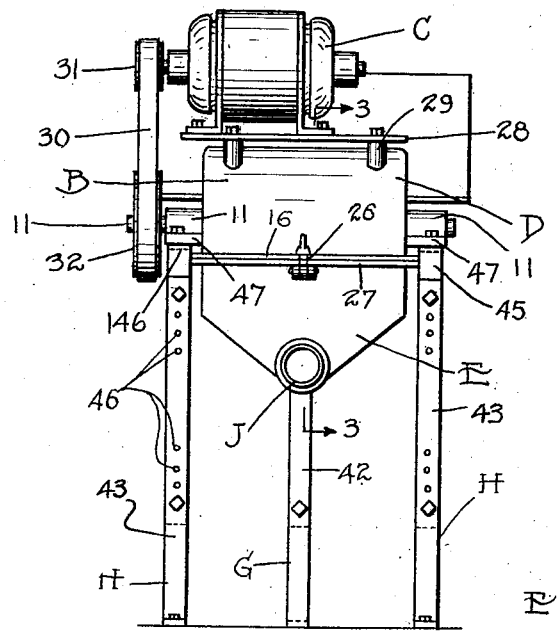
Fig. 2 is a front elevational view of the structure shown in Fig. 1.

The invention is shown in its entirety in Figs. 1 and 2 and comprises a receiver or tank A which feeds into a separating unit B, operated by an electric motor C mounted thereon. The separating unit B consists of a casing D to which is hingedly attached a lower closure member E which carries the screen element F of the invention. This structure is mounted upon legs G and H so that the separator B is raised above the floor level, permitting the strained liquid to be removed therefrom through an outlet J. The liquid to be strained is to be placed in the receiver or reservoir A and fed into the strainer B where the separation occurs, the strained liquid passing through the outlet J while the residue or sediment remains within the screen F. Upon dropping the closure E to the position shown in dotted lines in Fig. 1 the residue may be quickly and easily removed from the screen proper.

The casing D of the separating unit B is of cylindrical formation and is provided with bosses 10, in which is journalled a longitudinal shaft 11. This shaft has mounted upon it two spiders 12 which are shown in detail in Figs. 3 and 4. Each of these spiders is provided with a plurality of bifurcated arms 13 which are obliquely arranged relative thereto. Between these arms and lodged in the bifurcations thereof are mounted a plurality of blades 14 which assimilate in formation an ordinary paddle wheel and which form the agitating member of the invention which is indicated in its entirety at K. The upper portion 15 of casing D is curved to closely fit around the exterior periphery of the agitating member K, while the lower portion which terminates shortly below the bosses 10 is open and formed with a flange 16 extending around the same. At the rearward portion of casing D the wall 17 thereof is extended rearwardly to provide a funnel 18 leading into the interior of said casing, which funnel is formed with a narrow slot 19 extending longitudinally thereof. A narrow flange 20 is formed around this opening which serves to hold the receiver or reservoir A mounted on it as clearly shown in Fig. 1.

The lower portion of the separating unit B consists of the closure E, previously referred to, which is hopper shaped and terminates in a horizontally arranged outlet 21 in which may be screwed, or otherwise secured, the outlet pipe J. This closure carries the removable screen F which is of such a size and shape as to close the entire upper opening through the same when properly positioned therein. Closure E is hingedly connected to the casing D at 22 and is formed with a flange 27 extending along the opening thereof and adapted to register with a flange 16 of casing D when said closure is in its closed position. Said closure is adapted to be held in its normal closed position as shown in full lines in Figs. 1 and 3 by means of a wing nut 23 screwable upon a bolt 24 which is hingedly connected to lugs 25 and adapted to operate within a slot 26 formed in the flanges 16 and 27.

The device is driven by the electric motor C which is mounted upon a plate 28 which is secured to lugs 29 formed upon the upper portion of casing D. A belt 30 passing over a pulley 31, attached to the drive shaft of motor C turns a pulley 32, which is secured to the outer end of the shaft 11. When the motor C is started the agitating member K is caused to travel in the direction of the arrow, as shown in Fig. 3, the blades 14 tending to wedge the volume of liquid between them and the screen F towards said screen and thereby causing the same to be forced through the perforations in the screen. In this manner the liquid, which is fed through the slot 19, is caused to strain through the screen F and flow to the bottom of the hopper-like portion of the closure E, where the same passes through the outlet pipe J.

The screen F of the invention is shown in detail in Fig. 5. This structure comprises a grid 33 of arcuate formation which consists of two solid end pieces 34 connected by flanges 35 and 36 and by a number of longitudinal bars 37. The said bars are in turn connected by arcuate bars 38 integrally connected to form a unitary construction. Within the interior of the arcuate grid thus formed is mounted a wire screen 39, or any other suitable perforated sieve which may be soldered in place to form a tight construction or otherwise attached thereto. The screen F, as before stated, is removable and is mounted in the upper portion of the closure E. This closure is arranged with arcuate slots 40 which receive the solid ends 34 of the same and provide a seat upon which the entire structure may rest. It will be noted that these ends protrude outwardly at 140 where the same may be machined to accurately fit along the interior of the closure E so as to form a tight joint and to prevent the liquid from flowing along the ends 34 instead of through the screen proper. When the closure E is closed it will be noted that the flanges 35 and 36 of the grid proper become clamped between the flanges 16 and 27 of the respective portion of the separator B so that the entire screen F is rigidly and securely held in place. When the closure E is dropped as indicated at 41 in dotted lines in Fig. 1 then the surface of the screen 39 becomes exposed, permitting the same to be cleaned and the foreign matter removed from the surface thereof. At the same time the entire screen, if desired, may be removed from the machine proper for the purpose of cleansing or to permit interchanging of other screens.

The legs G and H upon which the machine proper is carried consist of two uprights 42 and 43 which have bolted to them standards 44 and 45. By means of a number of bolt holes 46, these standards may be adjusted in height relative to said uprights. The standard 45 is bent at right angles at 146 and is bolted to ears 47 formed on the bosses 10 in which the shaft 11 is journalled. In addition two rearwardly extending bars 48 are bolted to the same ears and at their remote ends are attached to the standard 44.

In the operation of the device the liquid in entering the interior of the casing D is directed toward the blades 14, which in their movement cause the same to be forced against the screen and to pass therethrough. Due to the close position of these blades to the screen the foreign matter which remains upon the screen is carried up with it and due to the continual movement of said agitating member it is kept toward the upper surface of the liquid within the same. In this manner the surface of the screen 39 is at all times kept substantially free from foreign matter, thus permitting the fresh liquid to be quickly and effectively strained. Upon ceasing to operate the machine the remaining liquid within the same passes through the screen, leaving the residue deposited thereon which may be quickly and effectively removed from the screen in the manner previously disclosed.

Our invention is particularly advantageous in that a simple and efficient construction is provided in which the screen surface is substantially maintained free from the residue and foreign matter of the liquid to be strained. The same is further advantageous in that the liquid is to a certain extent, forced through the screen, thereby greatly accelerating the rapidity of the process and hence increasing the capacity of the machine. The parts of the machine are readily accessible and the screens may be quickly removed for the purpose of cleaning or interchanging, as desired.

Having described our invention in the form which we consider the best embodiment thereof we desire to have it understood that the same can be made in different ways and put to uses other than those disclosed within the scope of the following claims.

1. A strainer comprising an arcuate casing, a pair of bosses formed on the ends thereof, a shaft journal in said bosses, spiders mounted upon said shaft within said casing, blades attached to said spiders, said blades being obliquely arranged relative thereto, said blades moving along the periphery of the said casing, said casing extending below said bosses and being open at the lowermost portion, a closure for said casing having hoppered sides, said closure being hingedly connected to said casing on one side, means for detachably securing said closure to the casing at its other side, an outlet connected with the hoppered sides of said casing, and an arcuate screen mounted in the upper portion of said closure being concentrically positioned relative to said shaft and being arranged in close proximity to the outer ends of said blades, said screen closing the opening in said casing and a funnel in said casing for directing liquids into the same and upon said screen.

2. A strainer comprising a casing, an agitating member therein, a closure for said casing, an arcuate straining member positioned within said closure, comprising an arcuate grid having solid segmental shaped end members connected therewith and a screen positioned within said grid and secured thereto.

3. A strainer comprising a casing, a revoluble agitator within said casing, a screen structure adapted to be mounted in said casing comprising segmental solid end plates, spaced parallel bars connecting said end plates, spaced circumferential bars connecting said parallel bars, an arcuate screen attached to said bars and extending up to said solid end pieces, said screen structure being adapted to partly enclose the lower portion of said agitator, and means for feeding a fluid upon said screen.

4. A strainer comprising a casing having an opening in its lower portion, an agitating member positioned within said casing, a closure for said opening having a flange registering with said casing flange, said closure flange having a recess therein along two sides, said closure being formed with end walls, a screen structure supported on and carried by said closure between said end walls comprising solid segmental end plates, spaced parallel bars connecting said end plates, spaced circumferential bars connecting said parallel bars, an arcuate screen attached to said bars and extending up to said end pieces, flanges formed along the two upper parallel bars adapted to be seated in said recesses and to be flush with said closure flanges, and outwardly protruding sealing shoulders formed along the upper edges of said segmental end plates adapted to engage the end walls of said closure.

5. A strainer comprising an arcuate casing, a pair of bosses formed on the ends thereof, a shaft journaled in said bosses, an agitator mounted on said shaft, said casing being open at the bottom and extending below the center line of said shaft, a closure hinged to said casing along one side of the bottom thereof, an arcuate screen mounted in said closure, said screen being of less extent than a semicircle, and means for holding said closure in closed position.

6. A strainer comprising an arcuate casing, a pair of bosses formed on the ends thereof, a shaft journaled in said bosses, an agitator mounted on said shaft, said casing being open at the bottom and extending below the center line of said shaft, a closure hinged to said casing along one side of the bottom thereof, an arcuate screen mounted in said closure, said screen having the extreme portion thereof on one side inclining upwardly and a funnel formed in said casing having a sloping wall connecting with said screen and inclining in the same direction as the inclined portion of said screen.

7. A strainer comprising a casing having an opening in its lower portion, a removable closure for said opening and a screen detachably mounted in and carried by said closure, means for holding said closure in closed position, and means formed on said screen adapted to be engaged by said casing and closure for holding the screen in fixed position when the closure is closed.

8. A strainer comprising a casing having an opening at its lower portion, a shaft journaled in said casing, an agitating member positioned within said casing and mounted on said shaft, said agitator having a portion depending through said opening, a removable closure hinged to said casing adapted to close said opening, an arcuate screen loosely mounted in said closure for immediate withdrawal therefrom, means formed on said closure for positioning the sides of said screen relative to said agitator, and means formed on said closure for positioning the ends of said screen relative to said agitator, said positioning means causing said screen to assume the proper position relative to said agitator upon closing of said closure, and means formed on said screen and adapted to be engaged by said casing and closure for clamping the screen in rigid position when said closure is closed.

In testimony whereof we affix our signatures.

EMMETT CURTIS.
ERNEST A. MUMMÉ.